United States Patent [19]

Walther

[11] Patent Number: 4,659,630

[45] Date of Patent: Apr. 21, 1987

[54] TREATMENT OF LEATHER WITH RESINS AND LACQUERS DERIVED FROM POLYAMINOACRYLATES

[75] Inventor: Werner Walther, Stuttgart, Fed. Rep. of Germany

[73] Assignee: Sandoz Ltd., Basel, Switzerland

[21] Appl. No.: 736,096

[22] Filed: May 20, 1985

Related U.S. Application Data

[62] Division of Ser. No. 440,287, Nov. 9, 1982, Pat. No. 4,529,754.

[30] Foreign Application Priority Data

Nov. 9, 1981 [DE] Fed. Rep. of Germany ....... 3144452
Sep. 7, 1982 [CH] Switzerland ................. 5312/82

[51] Int. Cl.$^4$ ................ B32B 9/02; B32B 9/04
[52] U.S. Cl. ................... 428/473; 427/386; 427/389; 427/412
[58] Field of Search ........... 252/8.57, 8.8; 428/473; 523/404; 427/386, 412, 389

[56] References Cited

U.S. PATENT DOCUMENTS

| | | | |
|---|---|---|---|
| 3,719,629 | 3/1973 | Martin et al. | 523/456 |
| 3,945,963 | 5/1976 | Levine et al. | 525/119 |
| 3,991,238 | 11/1976 | Topfl et al. | 427/386 |
| 4,126,596 | 11/1978 | Schimmel et al. | 525/119 |
| 4,221,885 | 9/1980 | Schimmel et al. | 525/119 |
| 4,225,480 | 9/1980 | Schimmel et al. | 525/119 |
| 4,272,621 | 6/1981 | McFadden et al. | 524/438 |
| 4,341,681 | 7/1982 | Schmakas et al. | 524/555 |
| 4,371,637 | 2/1983 | Topfl | 428/473 |

FOREIGN PATENT DOCUMENTS 0010318 4/1980 European Pat. Off. .
1415983 12/1975 United Kingdom .

*Primary Examiner*—Allan M. Lieberman
*Attorney, Agent, or Firm*—Gerald D. Sharkin; Richard E. Vila; Thomas C. Doyle

[57] ABSTRACT

A lacquer composition comprising a water soluble reaction product of
(a) a water soluble acrylic polymer or copolymer having pendant amine groups, and
(b) a glycidyl ether of a di- or polyhydric alcohol or monomeric phenolic compound having 2-4 aromatic hydroxy groups with the proviso that per amine equivalent of component (a) 0.5-0.85 epoxide equivalents of component (b) are present, the reaction product being hardened by a mixture of component (b) above and a glycidyl ether of a polymeric phenol-aldehyde condensate or of polyamine derived from ethyleneimine and/or propyleneimine.

The composition is useful for coating such substrates as leather.

34 Claims, No Drawings

TREATMENT OF LEATHER WITH RESINS AND LACQUERS DERIVED FROM POLYAMINOACRYLATES

This is a division of application Ser. No. 440,287, filed Nov. 9, 1982, now U.S. Pat. No. 4,529,754.

The invention relates to novel reaction products, and lacquer composition particularly for use in coating leather or textile material.

The invention provides a water-soluble reaction product of (a) a water soluble acrylic polymer or copolymer having pendant amine groups, and (b) a glycidyl ether of a di-or polyhydric alcohol or monomeric phenolic compound having 2–4 aromatic hydroxy groups with the proviso that per amine equivalent of component (a) 0.5–0.85 epoxide equivalents of component (b) are present.

Examples of such "monomeric phenolic compounds" are

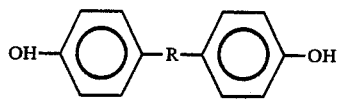

(a)

where R is $C_{1-4}$ alkylene

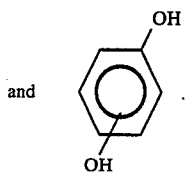

(b)

and

This reaction product may be hardened by the addition of a further glycidyl ether, preferably component (c) later defined.

By "water soluble" is meant that preferably the compound is fully miscible in all proportions.

By the term "amine equivalent" is meant the molecular weight per amine group present in the compound and by the term "epoxide equivalent" is meant molecular weight per epoxide group present.

Preferably the compound of component (a) contains pyridine groups or more preferably groups of formula (i)

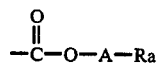

(i)

in which Ra is

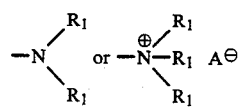

where
each $R_1$ independently is hydrogen or $C_{1-4}$alkyl
A is unsubstituted, linear or branched $C_{2-6}$alkylene or

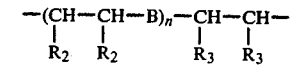

where
one $R_2$ is hydrogen and the other is hydrogen or methyl
and one $R_3$ is hydrogen and the other is hydrogen or methyl
n is 0, 1 or 2
$A^\ominus$ is an anion, and
B is —NH— or

where $R_1$ is as defined above.

Further according to the invention there is provided a lacquer composition comprising the reaction product of (a) a water soluble acrylic polymer or copolymer having pendant amine groups, (b) a glycidyl ether of a di- or polyhydric alcohol or of a monomeric phenolic compound having 2–4 aromatic hydroxy groups present; and (c) a glycidyl ether of a polymeric phenol-aldehyde condensate or of a polyamine derived from ethyleneimine and/or propyleneimine with the proviso that per amine equivalent of component (a) 0.7 to 1.1 epoxide equivalents in total of components (b) and (c) are present.

Preferably the amine groups of component (a) are pyridine groups or more preferably of formula (i) defined above.

A further aspect according to the invention is a twin pack, the first pack comprising the reaction product of (a) a water soluble acrylic polymer or copolymer having pendant amine groups; and (b) a glycidyl ether of a di- or polyhydric alcohol or of a monomeric phenolic compound having 2–4 aromatic hydroxy groups;

with the proviso that per amine equivalent of component (a) 0.5–0.85 epoxide equivalents of component (b) are present; and the second pack comprising the product of mixing (b) a glycidyl ether of a di- or polyhydric alcohol or of a monomeric phenolic compound having 2–4 aromatic hydroxy groups; and (c) a glycidyl ether of a polymeric phenol-aldehyde condensate or of a polyamine derived from ethyleneimine and/or propyleneimine with the proviso that per amine equivalent of component (a) 0.7–1.1, in total, epoxide equivalents of components (b) and (c) are present.

Preferably the amine groups of component (a) are pyridine groups or of formula (i) defined above.

Preferably in lacquer compositions according to the invention 0.7–1.0, more preferably 0.9–1.0 (in total) epoxide equivalents of component (b) are present per amine equivalent of component (a). Preferably 0.03–0.1 more preferably 0.05 epoxide equivalents of component (c) are present per amine equivalent of component (a).

Preferably in a twin pack according to the invention 0.25–0.6 epoxide equivalents of component (b) and 0.03–0.1 epoxide equivalents of component (c) per amine equivalent of component (a) are present in the second pack.

In the groups of formula (i)
A is preferably $$-(CH-CH-B)_n-CH-CH-;$$
$$\phantom{-(}|\phantom{H-}|\phantom{H-B)n-}|\phantom{H-}|$$
$$\phantom{-(}R_2\phantom{H}R_2\phantom{H-B)n-}R_3\phantom{H}R_3$$

each $R_1$ is preferably hydrogen;
each $R_2$ and each $R_3$ is preferably hydrogen; n is preferably zero or 1.

Preferably B is —NH—.

Preferably the compounds of component (a) have an amine equivalent of 280–2000, more preferably 350–1200, most preferably 400–700.

When the compounds of component (a) are in aqueous solution they are preferably in quaternised form, for example the group of formula (i) being in amine hydrochloride form. The solubility in water of component (a) is controlled by the pH of the aqueous solution, for instance by the conversion of non-quaternised form to the respective salt, in the above case by addition of acid.

Preferred compounds of components (a), (b) and (c) are described in U.S. Pat. No. 3,719,629 the contents of which are incorporated by reference.

Compounds of component (a) may also have reactive OH groups present for example $$-\overset{O}{\underset{\|}{C}}-O-B_1-\overset{}{\underset{R_5}{C}H}-OH$$

or $-\overset{O}{\underset{\|}{C}}-O-CH_2\overset{}{\underset{OH}{C}H}-CH_2-\overset{\oplus}{N}\overset{R_1}{\underset{R_1}{\diagdown}}R_1 \quad A^{\ominus}$ or $-\overset{O}{\underset{\|}{C}}-O-CH_2\overset{}{\underset{OH}{C}H}-CH_2-N\overset{R_1}{\underset{R_1}{\diagdown}}$ where
$R_1$ and $A^{\ominus}$ are defined above $B_1$ is ($C_{1-6}$)alkylene or $$-(CH_2-\underset{R_5}{\overset{}{C}H}-O-)_m-CH_2-$$

$R_5$ is hydrogen or methyl and
m is 0–10.

Preferred compounds of component (b) are glycidyl ethers of ethylene glycol or propylene glycol or the di- and tri-glycols thereof, glycerin or a related trihydric alcohol or pentaerythritol or dipentaerythritol, hydroxyphenols and bisphenols. Preferred bisphenols are

OH—⟨◯⟩—⟨◯⟩—OH;

OH—⟨◯⟩—CH$_2$—⟨◯⟩—OH (Bisphenol F)

OH—⟨◯⟩—C(CH$_3$)$_2$—⟨◯⟩—OH.

(Bisphenol A)

More preferred compounds of component (b) are epoxides of bisphenol F and bisphenol A.

The most preferred compounds of component (b) are the diepoxides of bisphenol A and F which have the formula $$\overset{O}{\underset{}{\overset{/\diagdown}{CH_2}}}CH-CH_2-O-\text{⟨◯⟩}-B-\text{⟨◯⟩}-O-CH_2-\overset{O}{\underset{}{\overset{/\diagdown}{CH}}}CH_2$$

where B is —CH$_2$— in the case of bisphenol F and C(CH$_3$)$_2$— in the case of bisphenol A.

The viscosity of the reaction product of components (a) and (b) is preferably 12,000–25,000, more preferably 16,000–20,000 cps at 20° C. The pH of the solution containing the reaction product of components (a) and (b) is preferably weakly acid, this being achieved for example by the addition of hydrochloric acid, formic acid, acetic acid or another similar acid.

Preferred compounds of component (c) are the glycidyl ethers of phenol-formaldehyde condensation products. More preferred are the semi solid to fluid phenol-formaldehyde (novolak) reaction products with epichlorohydrin. Such compounds have an epoxide equivalent of 106–250. Such preferred compounds are of the formula

$$\underset{(R)_y}{\text{⟨◯⟩}}\overset{OCH_2-\overset{O}{\overset{/\diagdown}{CH}}-CH_2}{\phantom{X}}-CH_2-\left[\underset{(R)_y}{\text{⟨◯⟩}}\overset{OCH_2-\overset{O}{\overset{/\diagdown}{CH}}-CH_2}{\phantom{X}}-CH_2-\right]_x\underset{(R)_y}{\text{⟨◯⟩}}\overset{OCH_2-\overset{O}{\overset{/\diagdown}{CH}}-CH_2}{\phantom{X}}$$

where each R independently is $C_{1-4}$alkyl and y is a number 0 to 2 and x is an average number from 0 to 20.

Preferably all alcohol groups of component (b) and of component (c) are epoxidised.

The application of lacquer composition according to the invention is simple. The reaction product of components (a) and (b) is a resin which is hardened by the addition of hardener, the hardener being a mixture of components (b) and (c). The resin is dissolved in water or thinned in water and the hardener is added. The resin-hardener mixture is then applied to the substrate, preferably leather, dried and warmed for 5 to 60 minutes (preferably 15 to 30 minutes) at usual hardening temperatures 60° to 90° C. (preferably 60°–80° C.) and the reaction of resin and hardener is allowed to go to completion at room temperature. The reaction product of components (a) and (b) is formed by dissolving the compound of component (a) in water and adding component (b) preferably heating to the reaction temperature (70°–80° C. over 50–90 minutes) and allowing to cool. The reaction product (in salt form) remains dissolved in water and does not have too high a viscosity so that it can conveniently be applied.

The coatings formed by the reaction products, lacquer compositions and twin packs according to the invention are of better quality than those hitherto known. The reaction products, compositions and packs of the invention have a good shelf life, particularly the reaction product of components (a) and (b).

The coatings so produced are flexible and do not crack when the substrate (leather) is used, for example when folded or flexed.

Preferred substrates to which the reaction products, coating compositions and twin packs can be applied are leather and textile material, more preferably synthetic and natural leather. Further additives may be added to the reaction products, compositions and twin packs according to the invention. Such additives are matt finish compounds, compounds to improve handle, dyestuffs or compounds to improve the water fastness of the substrates to be coated (for example poly dimethyl siloxane).

The invention will now be illustrated by the following Examples:

EXAMPLE 1

(a) A polyaminoacrylate resin is formulated as follows:

The following weights of reactants and solvents were used to prepare a copolymer as in Examples 1 and 2 of U.S. Pat. No. 3,719,629: isopropanol, 1,495 grams; methyl methacrylate, 375 grams; butyl acrylate, 750 grams; methacrylic acid, 185 grams; azobis(isobutyronitrile), 13 grams; ethyleneimine, 185 grams and ethylene glycol monoethyl ether, 1,000 grams. During the distillation step, 1,900 milliliters of liquid were collected.

| Solution properties: | |
|---|---|
| % Solids | 58.0 |
| Viscosity | 3700 |
| Appearance | clear, light yellow |
| amine equivalent weight | 840 |
| amine hydrogen equivalent weight | 563 |
| residual ethyleneimine, weight % | 0.12 |

The calculated n value was 1.33

(b) 20 g of the polyaminoacrylate resin prepared above (dissolved in 40 g of a 1:1 mixture of isopropanol and ethyleneglycolmonoethylether) is reacted with 2 g of formic acid in 28 g of water. 5.3 g of the reaction product of 1 mole of Bisphenol F with 2 mole of epichlorohydrin (Rütapox 0161) and 2 g of the reaction product of a phenol-formaldehyde polymer and epichlorohydrin (Rütapox 0300) having an epoxide equivalent of 175–179 are added and this mixture is stirred well whilst adding 50 g of water. 0.2 g of a polydimethyl siloxan emulsion (Dow Corning 929) is added.

Dyed and tanned leather is coated with the resulting mixture and the leather is dried at 70° C. for ½ hour. A very good coating on the leather is produced.

EXAMPLE 2

20 g of the polyaminoacrylate resin of Example 1 are mixed with 3.3 g of Rütapox0161 (defined in Example 1) in 30 g of water. 8 g of water are added and the mixture is heated to 70° C. and allowed to react out by cooling to room temperature. The resulting product has a viscosity of 16,000–20,000 cps at 20° C. As carried out in Example 1, 2 g of Rütapox 0161 and 1.8 g of Rütapox 0300 are added according to Example 1 and leather is treated as in Example 1. A good coating results.

What is claimed is:

1. A method for coating leather comprising applying to the leather a water-soluble reaction product of
   (a) a water-soluble acrylic polymer or copolymer having pendant amine groups and
   (b) a glycidyl ether of a di- or polyhydric alcohol or monomeric phenolic compound having 2–4 aromatic hydroxy groups, with the proviso that per amine equivalent of component (a) 0.5–0.85 epoxide equivalents of component (b) are present.

2. A method according to claim 1 in which the compound of component (a) contains pyridine groups or groups of formula (i)

in which $R_a$ is

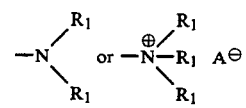

where each $R_1$, independently, is hydrogen or $C_{1-4}$alkyl,

A is unsubstituted, linear or branched $C_{2-6}$alkylene or

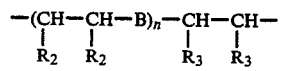

where one $R_2$ is hydrogen and the other is hydrogen or methyl and one $R_3$ is hydrogen and the other is hydrogen or methyl, n is 0, 1 or 2, $A^\ominus$ is an anion, and B is —NH— or

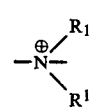

where $R_1$ is as defined above, and component (b) is a glycidyl ether of ethylene glycol, propylene glycol, or a di- or tri-glycol thereof, or of a related trihydric alcohol or of pentaerythritol or dipentaerythritol or of a hydroxyphenol or a bisphenol.

3. A method according to claim 1 wherein component (a) contains groups of the formula

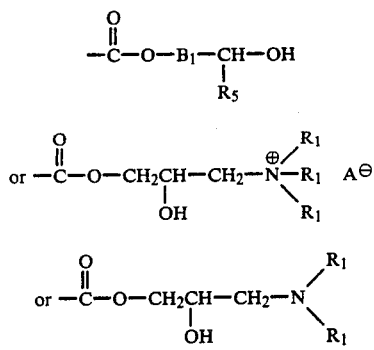

where each $R_1$, independently, is hydrogen or $C_{1-4}$alkyl,
$B_1$ is $(C_{1-6})$alkylene or

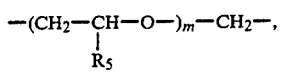

$R_5$ is hydrogen or methyl,
m is 0–10 and
$A^\ominus$ is an anion.

4. A method according to claim 2 wherein the compound of component (a) contains amine groups of formula (i), in which
A is $-CH_2-CH_2-NH)_nCH_2-CH_2-$,
n is 0 or 1 and
$R_1$ is hydrogen.

5. A method according to claim 1 wherein component (a) has an amine equivalent of 280–2000.

6. A method according to claim 2 wherein component (a) has an amine equivalent of 350–1200.

7. A method according to claim 3 wherein component (a) has an amine equivalent of 350–1200.

8. A method according to claim 4 wherein component (a) has an amine equivalent of 400–700.

9. A method according to claim 1 wherein component (b) is an epoxide of bisphenol F or of bisphenol A.

10. A method according to claim 2 wherein component (b) is an epoxide of bisphenol F or of bisphenol A.

11. A method according to claim 8 wherein component (b) is an epoxide of bisphenol F or of bisphenol A.

12. Leather coated according to the method of claim 1.

13. A method for coating leather comprising applying to the leather a lacquer composition comprising the reaction product of
   (a) a water soluble acrylic polymer or copolymer having pendant amine groups,
   (b) a glycidyl ether of a di- or polyhydric alcohol or of a monomeric phenolic compound having 2–4 aromatic hydroxy groups present and
   (c) a glycidyl ether of a polymeric phenolaldehyde condensate or a glycidyl ether of a polyamine derived from ethyleneimine and/or propyleneimine, in water, with the proviso that per amine equivalent of component (a) 0.7 to 1.1 epoxide equivalents, in total, of components (b) and (c) are present.

14. A method according to claim 13 wherein component (c) is a glycidyl ether of a phenol-formaldehyde condensation product.

15. A method according to claim 13 in which the compound of component (a) contains pyridine groups or groups of formula (i)

 (i)

in which $R_a$ is

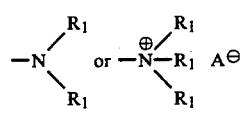

where each $R_1$, independently, is hydrogen or $C_{1-4}$alkyl,
A is unsubstituted, linear or branched $C_{2-6}$alkylene or

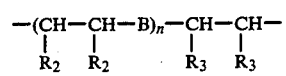

where one $R_2$ is hydrogen and the other is hydrogen or methyl
and one $R_3$ is hydrogen and the other is hydrogen or methyl,
n is 0, 1 or 2,
$A^\ominus$ is an anion, and
B is $-NH-$ or

where $R_1$ is as defined above,
and component (b) is a glycidyl ether of ethylene glycol, propylene glycol or a di- or tri-glycol thereof, or of a related trihydric alcohol, or of pentaerythritol or dipentraerythritol, or of a hydroxyphenol of a bisphenol and component (c) is selected from glycidyl ethers of phenolformaldehyde condensation products.

16. A method according to claim 15 wherein 0.7–1.0 epoxide equivalents of (b) and 0.03–0.1 epoxide equivalents of (c) are present per amine equivalent of (a).

17. A method according to claim 14 wherein component (a) of the lacquer composition contains groups of the formula

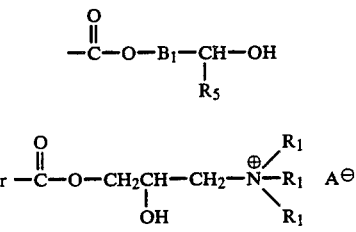

-continued $$\text{or } -\overset{O}{\underset{\|}{C}}-O-CH_2CH-CH_2-N\overset{R_1}{\underset{R_1}{\diagdown}}$$
$$\phantom{\text{or } -\overset{O}{\underset{\|}{C}}-O-CH_2}\underset{OH}{|}$$

where each $R_1$, independently, is hydrogen or $C_{1-4}$alkyl, $B_1$ is $(C_{1-6})$alkylene or $$-(CH_2-\underset{\underset{R_5}{|}}{CH}-O-)_m-CH_2-,$$

$R_5$ is hydrogen or methyl,
m is 0–10 and
$A^{\ominus}$ is an anion.

18. A method according to claim 15 wherein the compound of component (a) contains amine groups of formula (i), in which
A is $-CH_2-CH_2-NH)_nCH_2-CH_2-$,
n is 0 or 1 and
$R_1$ is hydrogen.

19. A method according to claim 16 wherein the compound of component (a) contains amine groups of formula (i), in which
A is $-CH_2-CH_2-NH)_2CH_2-CH_2-$,
n is 0 or 1 and
$R_1$ is hydrogen.

20. A method according to claim 15 wherein component (b) is an epoxide of bisphenol F or of bisphenol A.

21. A method according to claim 19 wherein component (b) is an epoxide of bisphenol F or of bisphenol A.

22. A method according to claim 15 wherein (c) is a compound of the formula

[structure shown]

wherein each R, independently is $C_{1-4}$alkyl and y is a number 0 to 2 and x is an average number from 0 to 20.

23. A method according to claim 19 wherein
(b) is an epoxide of bisphenol F or of bisphenol A and
(c) is a compound of the formula

[structure shown]

where each R, independently, is $C_{1-4}$alkyl and y is a number 0 to 2 and x is an average number from 0 to 20.

24. A method according to claim 20 wherein (c) is a compound of the formula

[structure shown]

where each R, independently, is $C_{1-4}$alkyl and y is a number 0 to 2 and x is an average number from 0 to 20.

25. Leather coated with a lacquer composition comprising a reaction product of
(a) a water soluble acrylic polymer or copolymer having pendant amine groups,
(b) a glycidyl ether of a di- or polyhydric alcohol or of a monomeric phenolic compound having 2–4 aromatic hydroxy groups present, and
(c) a glycidyl ether of a polymeric phenolaldehyde condensate or a glycidyl ether of a polyamine derived from ethyleneimine and/or propyleneimine,
with the proviso that per amine equivalent of component (a) 0.7 to 1.1 epoxide equivalents, in total, of components (b) and (c) are present.

26. A method of coating leather which comprises applying to the leather an aqueous mixture of
(1) a water-soluble reaction product of
(a) a water soluble acrylic polymer or copolymer having pendant amine groups and
(b) a glycidyl ether of a di- or polyhydric alcohol or of a monomeric phenolic compound having 2–4 aromatic hydroxy groups,
with the proviso that per amine equivalent of component (a) 0.5–0.85 epoxide equivalents of component (b) are present, and
(2) a mixture of
(b), as defined above, and
(c) a glycidyl ether of a polymeric phenol-aldehyde condensate or a glycidyl ether of a polyamine derived from ethyleneimine or propyleneimine,
with the proviso that per amine equivalent of component (a) 0.7–1.1, in total, epoxide equivalents of components (b) and (c) are present.

27. A method according to claim 4 wherein component (b) is an epoxide of bisphenol F or of bisphenol A.

28. A method according to claim 6 wherein the reaction product of (a) and (b) has a viscosity of 12,000 to 25,000 cps at 20° C.

29. A method according to claim 10 wherein component (a) contains groups of formula (i).

30. A method according to claim 11 wherein the reaction product of (a) and (b) has a viscosity of 12,000 to 25,000 cps at 20° C.

31. A method according to claim 17 wherein 0.7–1.0 epoxide equivalents of (b) and 0.03–0.1 epoxide equivalents of (c) are present per amine equivalent of (a).

32. A method according to claim 21 wherein component (c) is a glycidyl ether of a phenol-formaldehyde condensation product.

33. A method according to claim 26 wherein the mixture of (1) and (2) is an aqueous mixture and said mixture is dried and heated to 60° to 90° C. following application to the leather.

34. A method according to claim 26 wherein component (a) contains groups of the formula

wherein $R_a$ is $-NH_2$ or $-NH_3^\oplus A^\ominus$,
n is 0 or 1
and $A^\ominus$ is an anion;
component (b) is an epoxide of bisphenol F or of bisphenol A; and
component (c) is a glycidyl ether of a phenol-formaldehyde condensation product.

* * * * *